Patented Mar. 13, 1923.

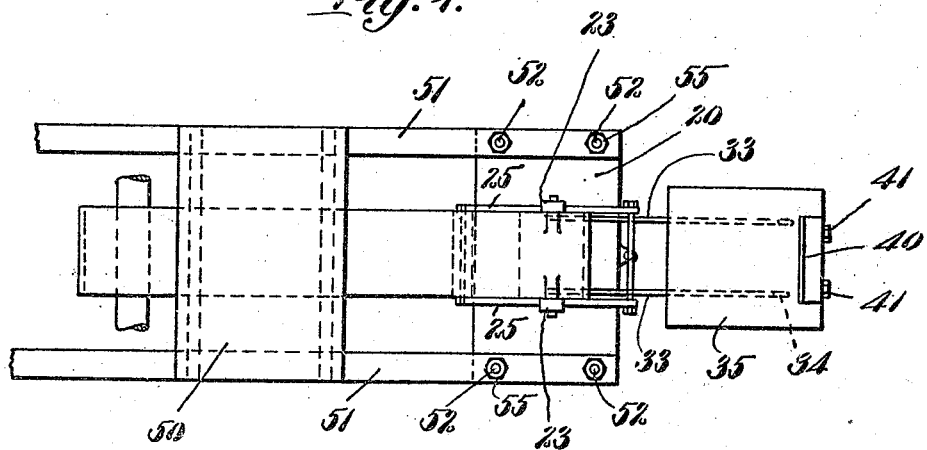
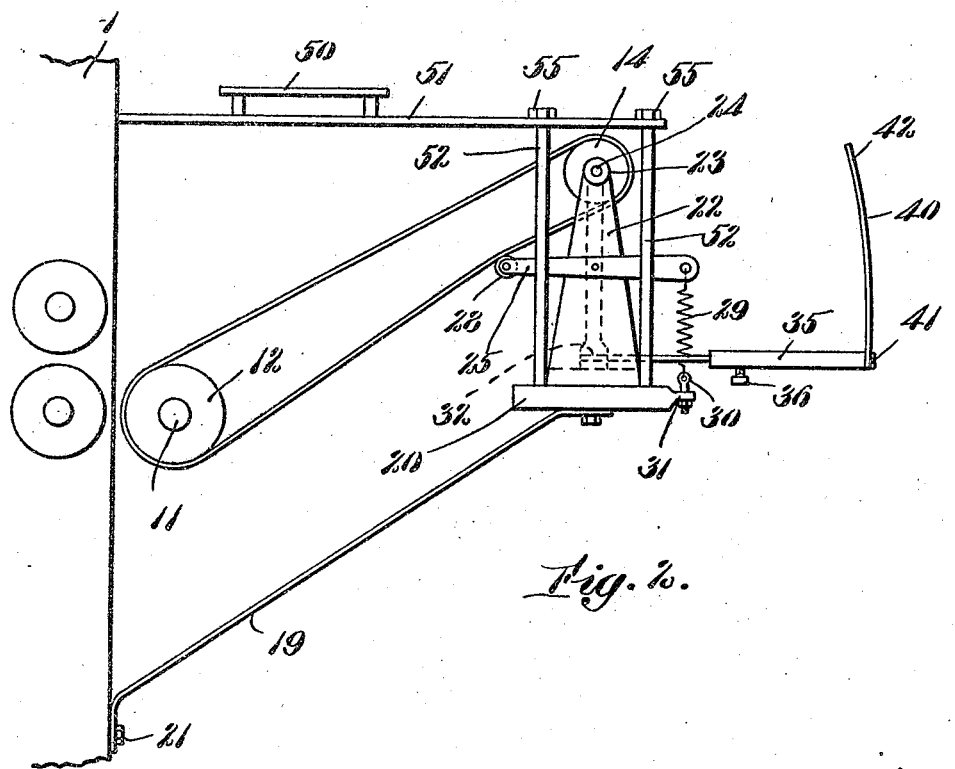

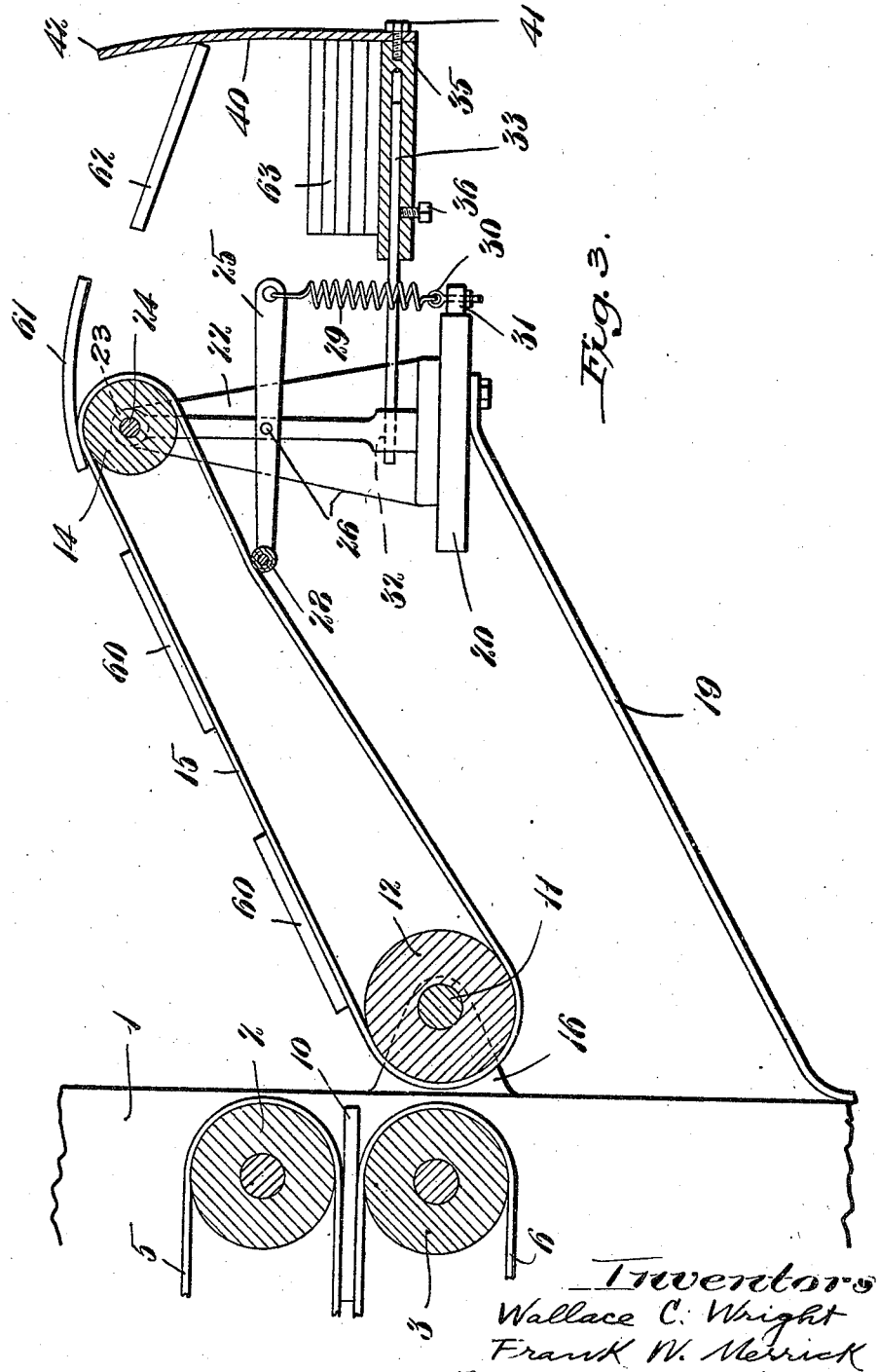

1,448,173

UNITED STATES PATENT OFFICE.

WALLACE C. WRIGHT, OF BROOKFIELD, NEW HAMPSHIRE, AND FRANK W. MERRICK, OF BOSTON, MASSACHUSETTS, ASSIGNORS, BY MESNE ASSIGNMENTS, TO AMERICAN SHOE MACHINERY COMPANY, A CORPORATION OF MASSACHUSETTS.

AUTOMATIC DELIVERY AND STACKING APPARATUS.

Application filed January 3, 1921. Serial No. 434,757.

*To all whom it may concern:*

Be it known that we, WALLACE C. WRIGHT, a citizen of the United States, and resident of Brookfield, in the county of Carroll and State of New Hampshire, and FRANK W. MERRICK, a citizen of the United States, and resident of Boston, in the county of Suffolk and State of Massachusetts, have invented an Improvement in Automatic Delivery and Stacking Apparatus, of which the following description, in connection with the accompanying drawings, is a specification, like letters on the drawings representing like parts.

In our present invention we have devised apparatus intended for attachment to machines and adapted to receive articles from a machine, convey the same to desired height, position and location, and to stack or pile the articles so received and delivered. While the invention contemplates the cooperation of a machine adjacent thereto, and preferably our apparatus is attached directly onto such machine, yet it is feasible to utilize the present apparatus to receive articles for the purpose of elevating, positioning, or transporting the same and to stack or pile such articles at the end of the conveying action. Our present apparatus is especially useful in combination with a machine such as the leather tempering and flexing machine illustrated in the prior Patent No. 1,313,510, issued August 19, 1919, wherein leather blanks, such as shoe soles, are fed into a machine, preferably at the top, and are conveyed through the machine and delivered to a receiving platform outside and at a lower position. Heretofore in the operation of such a leather tempering machine the operator piles bunches of leather into the feed receptacle and then was compelled to stoop over, pick up the blanks, straighten, sort, pile and stack the same and places the bunches thus picked up onto racks, shelves or receptacles. Our present apparatus contemplates being positioned adjacent to and preferably attached upon such a machine adjacent the delivery end portion, to receive the blanks as they emerge from the mechanism of the machine, to raise the same to a convenient height for the operator, and to automatically remove the blanks from the conveying devices, stack the same in a pile, and in substantially even manner, whereby bunches of completed blanks thus stacked may be readily removed at the convenience of the operator. The present automatic delivery and stacking device, in combination with the automatic feeding apparatus illustrated in our prior and copending application, Ser. No. 434,756, filed January 3, 1921, are intended to be utilized together and to thus enable one operator to more conveniently handle a plurality of machines, being required only to fill the receiving devices of the automatic feeding mechanism and to pick up completed stacks from the automatic delivery mechanism, thus obtaining a suitable interval of time to attend to another machine, tie up completed bunches, etc.

Our completed present apparatus may be operated at any suitable rate of speed, preferably being connected to or geared with the machine in which it is used as a delivery device. Very slight additional power is required. Suitable adjustment for height, length of work, and the like are made.

Referring to the drawings, illustrating preferred embodiments of the invention,

Fig. 1 is a plan view of the apparatus in convenient position for attachment to a machine of the type shown in the said patent;

Fig. 2 is a side view; and

Fig. 3 is a cross-sectional view on an enlarged scale.

As shown in the drawings, 1 designates the lowermost end portion adjacent the delivery end of a machine wherein the feed rolls 2 and 3 or other feeding instrumentalities deliver from the machine the work being operated upon by it. As here shown also, belts 5 and 6 constitute the conveying and acting means. In the machine 1 are illustrated belts the same feeding forwardly a leather sole blank, or similar work 10, which has just been acted upon by the devices of the machine 1. In leather tempering machines, it is important that the blank 10, as it emerges from the machines, in a tempered and moistened condition, should not lose its moisture, as it has been acted upon by the tempering machine to render the blank in just the desired condition of flexibility, moisture and "temper." Any further passing between rollers or the like would tend to squeeze out or remove the moisture and therefore in our present apparatus we have provided devices which will not exert any injurious action on the leather blank, but will convey, sort, stack and pile the same automatically leaving the blank or blanks in exactly the temper in which they have emerged from the machine. This feature while not important in connection with some machines, is of great importance in the particular leather tempering machine referred to in said patent or similar devices. Furthermore in such leather tempering machines the blanks are usually fed therethrough in close succession, being in fact substantially abutting and contiguous. In order to stack the blanks it is important, therefore, that they be separated a substantially uniform distance and for this purpose we operate the conveying portion of our apparatus at a substantially faster speed than the feeding devices of the machine 1. This is accomplished by suitably proportioned gears (not shown) extending from the axle 7 of the wheel 3 to the axle 11 of the pulley 14, around which the endless conveying belt 15 is led, extending from the pulley 12 to the pulley 14.

As it is also desirable and important to lift the soles from the lower part of the machine 1 upwardly to a convenient height for the operator, saving bending and stooping over,—the delivery rolls 2 and 3 being usually at the lowermost portion of the machine, we position the upper roll 14 at any desired height to elevate the blanks. The entire apparatus can be readily attached to the machine 1 by mounting the driving roller 12 with its axle 11 journaled in a pair of brackets 16 extending from or attached to the end 1 of the machine. A brace 19 carrying a plate 20 also extends from the machine 1, being secured the thereto by a belt 21, and to the plate 20 by a bolt 22. This brace 19 supports at a convenient height the plate 20, and standards 22, 22, which latter extend upwardly and carry journaled bearings 23, 23, in which the axle 24 of the top pulley 14 is journaled. It is desirable to provide a belt tightener for the belt 15 and to this end a lever 25 is pivotally secured by a pin 26, extending from one standard 22 to the other, said lever having one end forked to receive a roll 28 in position to bear upon the under side of the belt 15, and the other end of the lever 25 receives a spring 29 which in turn is attached to an adjustable bolt 30, threaded through a lug 31 on the plate 20. This affords an adjustable tension for the lever 25 and consequently an adjustable belt tightener to take up slack and wear.

Each standard 22 is formed with a perforation 32 near its base, in which rods 33 are fitted and extend forwardly, being arranged to fit within corresponding recesses 34 in a movable platform 35. An adjusting screw 36 serves to hold the platform 35 in position on the rods, thus allowing for adjustment toward and from the belt 15. Fitted on the end portion of the platform 35 is an upright guard 40 secured by bolts 41, 41. We prefer to have this guard curved inwardly at its upper portion substantially as indicated at 42. This guard may be of any suitable size and width, and also may be bent or curved as desired for the best results in the delivery of different lines of work.

For the convenience of the operator on which to pile soles when bundled and removed from the platform 35, we provide a shelf 50 supported on a pair of bars 51, 51, having one end attached to the machine 1, and the others resting on and secured to rods 52, 52, extending from the plate 20 and securely attached to the rods 51 by bolts 55.

The operation of the delivery and stacking apparatus will be readily understood on reference to the drawings. Blanks 10 coming from the delivery end of the machine are fed outwardly onto the rapidly moving belt 15, a plurality of such blanks being illustrated on the belt at 60, 60. This belt 15 moving at greater speed than the delivery of the blanks 10, acts to separate the same, and these blanks are moved upwardly and forwardly in separated position until reaching the top of the roll 14, no moisture being removed therefrom during this conveying action. It will be understood that the blanks are in temper and moist and are projected with sufficient speed so that upon reaching the top of the conveyor belt 15 they are forcibly thrown forwardly, as indicated at 61, and projected against the guard 40, strike the inclined portion 42 as indicated at 62, and thereupon settling downwardly onto the platform 35 and building up into the stack 63. We find that the guard 42 is all that is required to effect this stacking, guiding and guarding operation, since in the case of shoe soles, for example, the forward ends of the blanks are usually squared and no side guards or wings are requisite. The guard 40, however, could be formed in any desired way to receive different articles, being bent in a curve if possible when receiving heel blanks or the like. The blanks are separated a sufficient distance and fed at a sufficient speed so that as they are projected from the top of the conveyor 15 ample time is given for one blank to strike the guard and fall downwardly before the following blank is thrown from the conveyor belt to the guard 40, thus effecting an automatic separation and superimposed stacking of the blanks. In actual operation these blanks are fed outwardly so fast that it is difficult to follow the action, but the result of the flight from the pulley 14 to the guard 40 is substantially as indicated in diagrammatic form in Fig. 3.

We believe that our combination of a conveyor which automatically separates blanks a proper distance, which automatically throws, projects and thereby removes the blank from the conveyor,—effectually "snapping it off" free of the conveyor while maintaining the blank even when moist, pliable and in temper, substantially horizontal, for subsequent stacking,—and acts to separate successive blanks in vertical alinement while in the air during the throwing or projection of the blank from the conveyor to a stacking device, is distinctly new, and we wish to claim the same broadly. The upper roller 14 is preferably made of small enough diameter, or the conveyor belt 15 run at sufficient speed, to insure the automatic removal of the blank. This feature is of importance, since moist and tempered leather blanks are extremely pliable and might cling to the conveyor, in which case a stripper or the like would be requisite, which latter would tend to remove some of the moisture from the blank. Our apparatus, while extremely simple, is efficient and has proven to be successfully operable in actual practice.

Our invention is further described and defined in the form of claim as follows:

An apparatus of the kind described, comprising a stacking device, conveying means associated therewith and adapted to convey blanks of substantial thickness and weight toward said stacking device, said conveyor so constructed and arranged as to raise the blanks and automatically space the same to deliver the blanks at a relatively higher plane than at the point received, and to impart considerable momentum to said blanks, a deflector positioned in the path of flight of said delivered blanks, said deflector being arranged at such an angle with respect to the line of flight of the projected blanks as to stop the blanks in their flight while yet allowing the blanks to retain sufficient momentum to positively project said blanks downwardly into the stacking device.

In testimony whereof, we have signed our names to this specification.

WALLACE C. WRIGHT.
FRANK W. MERRICK.